United States Patent [19]
Barwick
[11] 3,911,207
[45] Oct. 7, 1975

[54] FM DEMODULATOR AND CONTROL CIRCUITRY FOR A FACSIMILE SYSTEM

[75] Inventor: Morris N. Barwick, Orlando, Fla.
[73] Assignee: Exxon Research and Engineering Company, Linden, N.J.

[22] Filed: Nov. 21, 1973
[21] Appl. No.: 417,797

[52] U.S. Cl. .......... 178/6; 178/DIG. 7
[51] Int. Cl.[2] .......... H04N 1/40
[58] Field of Search .......... 178/6, DIG. 7

[56] References Cited
UNITED STATES PATENTS
3,467,772 9/1969 Crane .......... 178/6

*Primary Examiner*—Howard W. Britton
*Assistant Examiner*—Edward L. Coles
*Attorney, Agent, or Firm*—N. Norris

[57] ABSTRACT

FM signals within a predetermined bandwidth representing dark-light variations in a document are transmitted over a communications network to a facsimile receiver. Demodulation of these FM signals is accomplished by a single shot multivibrator which is triggered in response to the FM signals and an average DC voltage detector connected to the output of the multivibrator such that the average DC voltage represents the ratio of the astable state duration to the period of the multivibrator cycle. Writing on a copy medium in response to the demodulated FM signal is initiated by a control circuit responsive to the transmission of an initiating signal from the transmitting location.

14 Claims, 5 Drawing Figures

FM DEMODULATOR AND CONTROL CIRCUITRY FOR A FACSIMILE SYSTEM

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

In several commercially available facsimile systems, the information bearing signals which are transmitted over the communications network are FM (frequency modulated) signals. In general, these signals lie in an FM bandwidth of 1,500 Hz. to 2400 Hz. which represents an audio range which is transmittable over ordinary telephone lines. Where this frequency range is utilized, the 1,500 Hz. signal usually represents a white level, the 2,400 Hz. signal represents a black level and signals in the frequency range between 1,500 Hz and 2,400 Hz. represent varying degrees of gray.

Various demodulator circuits for the FM signal have been proposed. One type of demodulator involves the use of a phase locked loop comprising a double balanced modulator and a voltage controlled oscillator as described in copending application Ser. No. 332,925 filed Feb. 16, 1973 now, U.S. Pat. No. 3,859,459. Another demodulator circuit is shown in U.S. Pat. No. 3,467,772 — Crane as comprising a pair of parallel single-shot multivibrator circuits which are triggered by frequency doubled FM signals. By simultaneously applying the trigger signals to the multivibrators and providing one of the multivibrators with a faster response time than the other, the astable state of one of the multivibrators varies as a function of the trigger signal frequency. As a result, the output signals from the multivibrators may be ANDed to produce pulses having a pulse width which varies with the frequency of the trigger signals. By properly choosing the response times for the multivibrators, zero pulse width is achieved in response to 1,500 Hz. or white while the maximum pulse width is achieved in response to 2400 Hz. or black.

As pointed out in the Crane patent, the use of the parallel multivibrators is particularly desirable in that they allow a zero DC level to be generated to 1,500 Hz. or white to minimize the possibility of a slight gray signal being produced. In addition, the demodulator circuitry disclosed in the Crane patent is desirable for cost reasons.

In the aforesaid copending application Ser. No. 332,925 filed Feb. 16, 1973, control circuitry is disclosed for initiating a facsimile transmission to a remote location by and in response to a 2,400 Hz. black signal. This signal is utilized to start the scanning motor of the transmitter as well as the receiver. However, it has been found that certain clicks which originate in the telephone communications network as well as high pitched short duration ambient noise at a receiver utilizing an acoustical-to-electrical transducer may falsely initiate start-up of the receiver.

SUMMARY OF THE INVENTION

It is an object of this invention to provide an FM facsimile receiver having an improved FM demodulator circuit.

It is a further object of this invention to provide an improved FM demodulator circuit which is relatively low in cost.

In accordance with these and other objects of the invention, the facsimile receiver is provided for producing a copy at a receiving location in response to FM signals transmitted over conventional voice communications telephone lines where the FM signals represent light-dark variations in a document at a remote transmitting location with a first frequency representing white on the document and a second frequency representing black on the document. The receiver comprises means for generating trigger signals in response to and having a frequency proportional to the frequency of the FM signals. A single shot multivibrator is coupled to the output of the means for generating trigger signals and characterized by an astable state of fixed duration initiated in response to one of the trigger signals where the ratio of the astable state duration to the period of a multivibrator cycle is directly proportional to the frequency of the FM signals. Detector means are coupled to the output of the single shot multivibrator for detecting the ratio of the astable state duration to the period of the multivibrator cycle and generating a writing control signal substantially proportional to that ratio. Writing means which are moved relative to recording medium by a scanning means are connected to the output of the single shot multivibrator so as to write on a recording medium in response to the writing control signal thereby producing a copy of the document of the recording medium.

It is another object of this invention to utilize the output of the improved demodulator circuit to immunize a facsimile receiver against false start-up in response to noise.

In accordance with this object, the facsimile receiver is provided with a scanning control circuit which is responsive to an FM signal in the white-black frequency range having a predetermined duration to energize the scanning means. In a preferred embodiment, the detector means generates a scanning control signal to bias the scanning means into a deenergize state when the ratio of the astable state duration to the period of the multivibrator cycle is less than a predetermined value. For this purpose, the scanning control means may comprise AND circuit means having a pair of inputs and an output connected to the scanning means. A first AND input means applies a first enabling signal to the AND circuit means in response to a writing control signal corresponding to FM signals having a frequency in excess of 1,400 Hz. for a predetermined length of time and a second input means applies a second enabling signal to the AND circuit means in response to the writing control signal corresponding to FM signals having a frequency in excess of 2,200 Hz. for a lesser predetermined length of time. In a preferred embodiment, the predetermined length of time is in excess of one-half second and the lesser predetermined length of time is 10–20 milliseconds and preferably 12–15 milliseconds.

In further accordance with this object, the AND circuit means may include feedback means for continuing generation of the second enabling signal after initial enabling of the AND circuit means even when the frequency of the FM signals is less than 2,200 Hz. The first AND input means may include storage means for continuing generation of the first enabling signal for a limited period of time even when the frequency of the FM signals is less than 1,400 Hz. as when the signal over the telephone lines is lost.

In further accordance with these objects, the detector means generates a writing control signal in response to frequencies less than 1,400 Hz. corresponding to ambient acoustical noise. The writing control signal varies as a function of the deviation in frequency below 1,400 Hz. such that at least one of the AND input means is biased to an inhibiting state in response to frequencies less than 1,400 Hz. In the preferred embodiment of the invention, the writing control signal has a magnitude substantially equal to zero at 1,500 Hz., increasing positively with increasing frequencies toward 2,400 Hz. and increasing negatively with decreasing frequencies toward zero Hz., where the negative control signal is ineffective to energize the writing means while being effective to bias the first AND input means to an inhibiting state which may be overcome by a writing control signal of zero or positive magnitude corresponding to 1,500 Hz. and above.

DETAILED DESCRIPTION OF A PREFERRED EMBODIMENT

Figure 1:
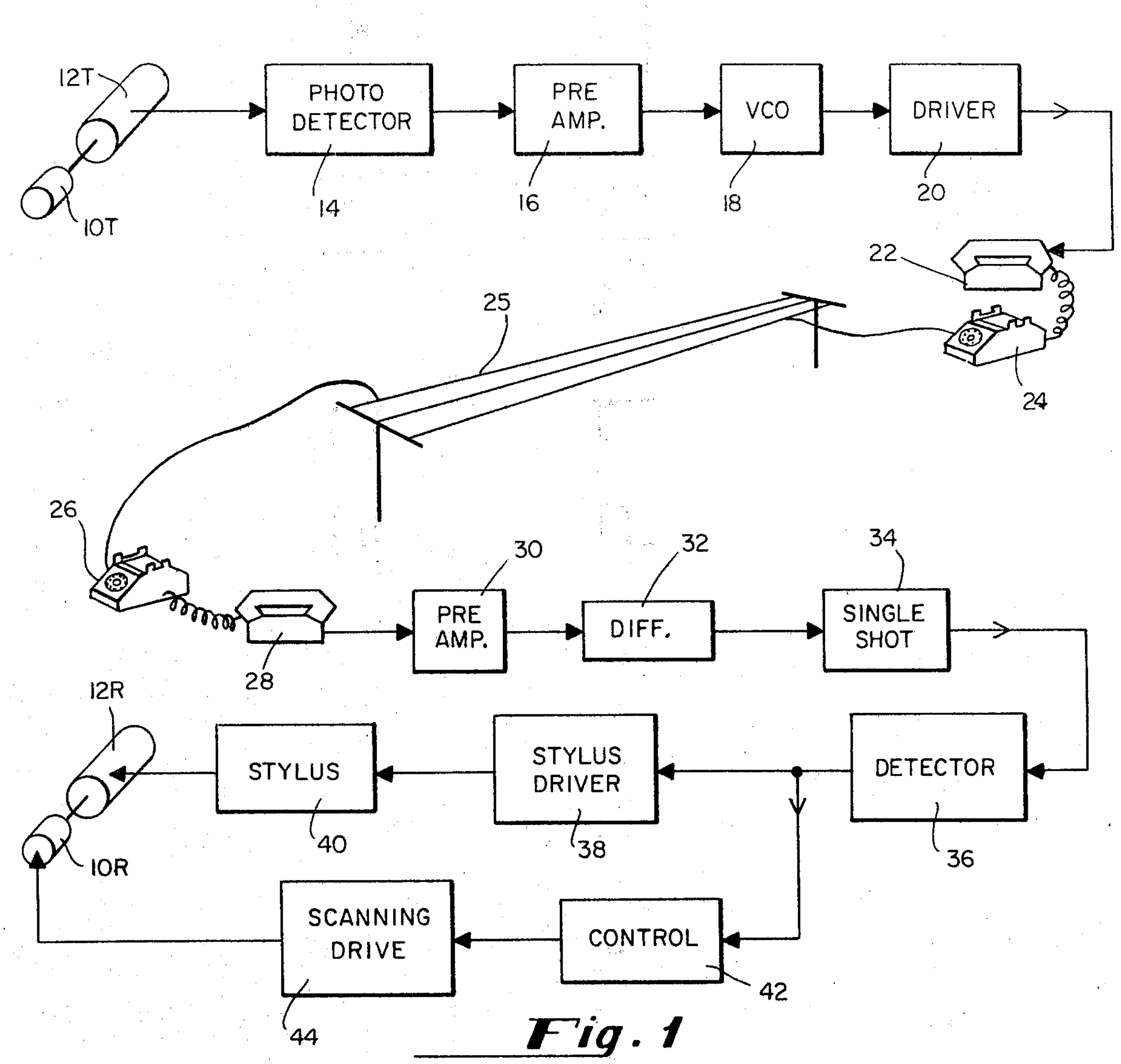
FIG. 1 is a block diagram of a facsimile system depicting one embodiment of the invention.

Referring now to the facsimile system shown in FIG. 1, a facsimile transmitter comprises a drum 12T rotated by a motor 10T so as to create a relative scanning movement between a document carried by the drum 12T and a scanning head not shown. As the scanning head is advanced axially along the drum 12T and the drum rotates about its axis, successive paths on the document are illuminated and variations in light intensity due to the reflectivity and transmissivity of the document are scanned by a photodetector 14. The photodetector 14 then converts these variations in light intensity which are a function of the reflectivity or transmissivity of the scanned document into electrical signals. These electrical signals are amplified at a preamplifier 16 and utilized to control a VCO (voltage controlled oscillator) 18 to generate frequency modulated signals representing the information content of the document carried by the drum 12T. The frequency modulated signals are then amplified by a driver 20 before being applied to an acoustical coupler 22 which is associated with a conventional telephone handset 24.

The frequency modulated carrier is transmitted by suitable means such as conventional telephone lines 25 to a facsimile receiver which is coupled to another conventional telephone handset 26 and associated acoustical coupler 28. The receiver includes a preamplifier 30.

In accordance with one important aspect of this invention, the FM carrier which is amplified by a preamplifier 30 is applied to a differentiating circuit 32 to generate trigger signals which are applied to an FM demodulator comprising a single shot multivibrator 34 and a detector circuit 36 for determining the average DC value of the single shot output. A writing control signal generated at the output of the detector 36 is then applied to a driver 38 for a stylus 40 associated with a movable head juxtaposed to a copy medium carried by a drum 12R. The relative scanning movement between the copy medium and the head is achieved by rotating the drum 12R by means of a motor 10R.

In accordance with another important aspect of the invention, the output of the detector 36 is applied to a scanning control circuit 42. The scanning control circuit 42 utilizes the output from the detector circuit 36 to initiate scanning of the copy medium by applying a signal to a scanning drive 44 in response to an FM signal from the transmitter. The output of the scanning drive 44 is applied to the motor 10R.

Normally, a facsimile transceiver is located at each location so as to provide that location with both a transmitting and a receiving function. The circuitry of a transceiver which is capable of performing the transmitting function depicted in FIG. 1 will now be described in detail with reference to FIG. 2. As shown there, a movable contact 100 of the start switch 102 has been moved from a position of engagement with a stationary contact 104-2 to a position of engagement with a stationary contact 104-1 so as to apply a voltage to a terminal 106 of the preamplifier 16 through a switch 108 having a movable contact 110 engaging a stationary contact 112-1 where the preamplifier comprising operational amplifiers 114 and 116. By the proper choice of a bias resistor 120 connected to a minus 8 volt power supply, a signal is applied to the terminal 106 of the operational amplifier 114 which corresponds in magnitude to that produced by the detection of a white area on the document carried by the photodetector 14. The output of the operational amplifier 114 is then applied to the succeeding operational amplifier 116 through a resistor 122 of the preamplifier 16 to produce a control signal applied to a voltage controlled oscillator 18 comprising a chip VCO such as Signetics Corporation NE566 which in turn produces a signal having a frequency of approximately 1,500 Hz. corresponding to white which is applied to a coupler 22.

Figure 3A:
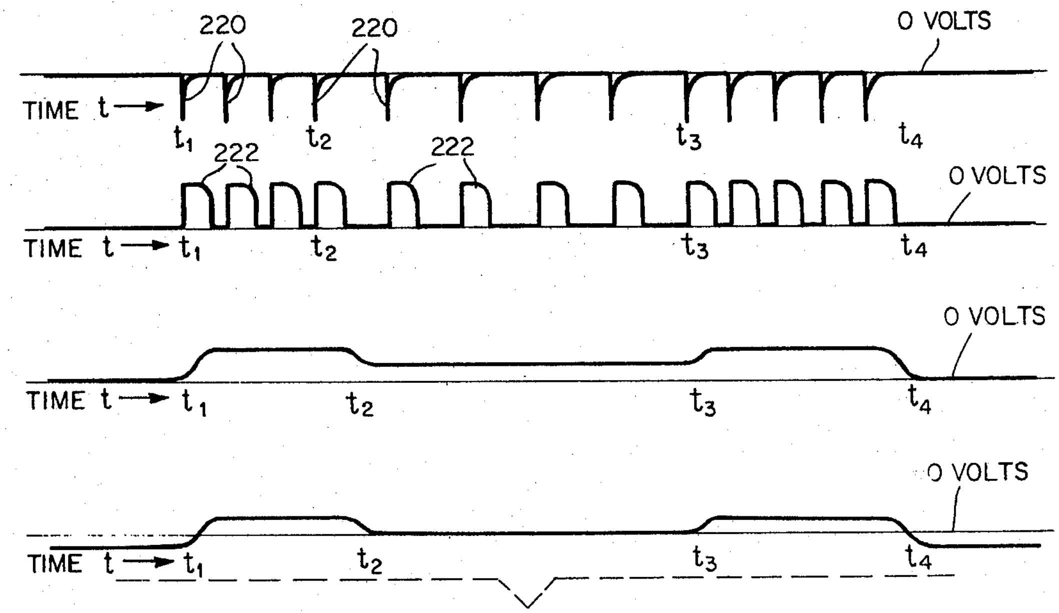
FIG. 3*a* is a diagram illustrating waveform generated by the receiving circuitry of FIG. 3.
Figure 3:
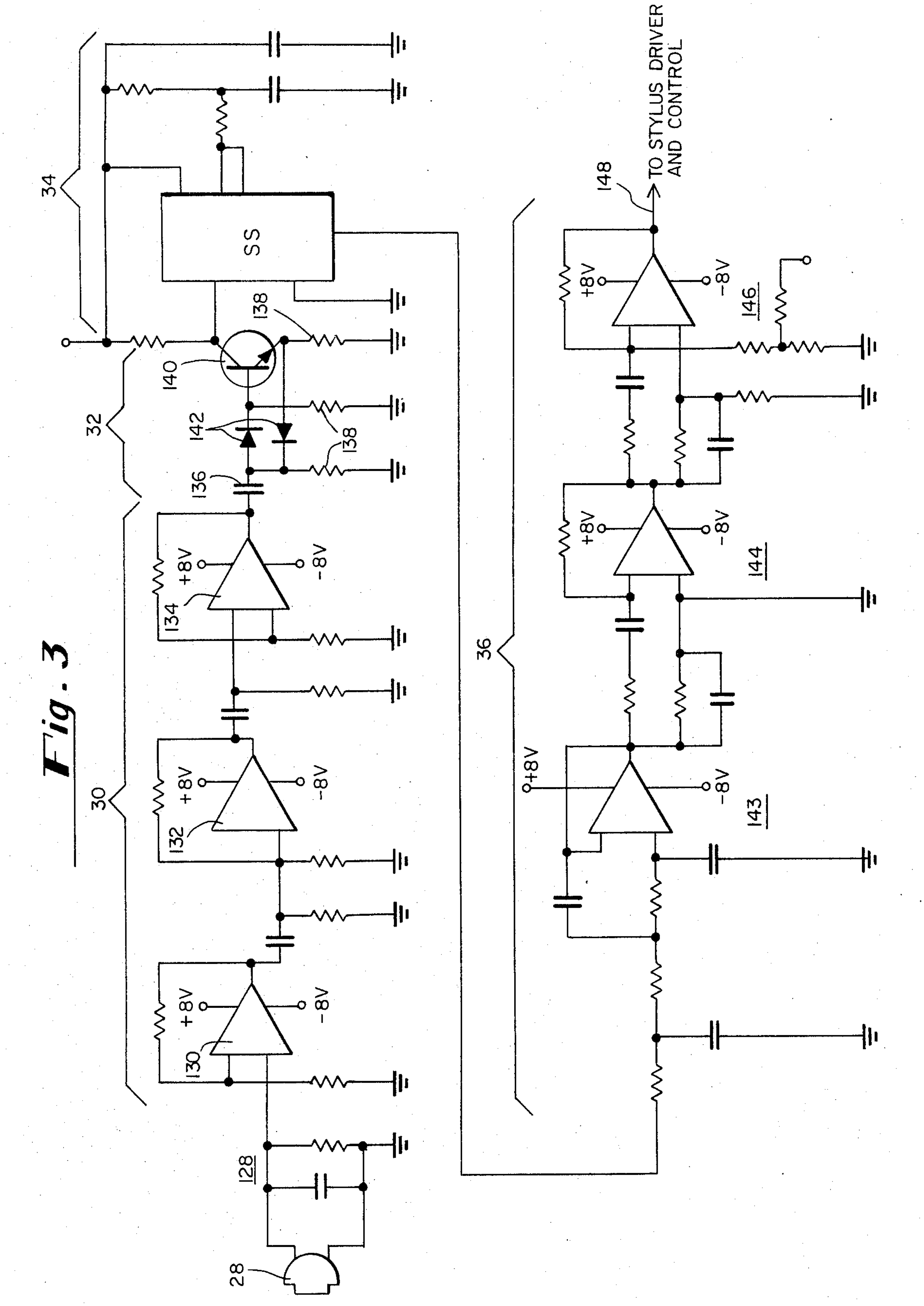
FIG. 3 is a schematic circuit diagram of the receiving portion of the facsimile transceiver embodying the invention.

After transmission of the 2,400 Hz. black signal through the telephone lines 25 to the receiver 26, the acoustical coupler 28 converts the acoustical signals from the handset 28 into electrical signals which are applied through an input filter 128 to the receiving portion of another transceiver comprising the preamplifier 30 which includes operational amplifiers 130, 132 and 134 as shown in FIG. 3. After amplification and squaring of the 2,400 Hz. black signal by the preamplifier 30, each zero crossing of the amplified and squared signal is differentiated by the differentiating circuit 32 comprising a capacitor 136, resistors 138 connected to the base and emitter of a transistor 140 and diodes 142. The diodes 142 which are connected from the capacitor 136 to both the base and the emitter of the transistor 140 are oppositely poled such that each zero crossing of the amplified and squared FM's 2,400 Hz. black signal will generate trigger signals at the collector of the transistor 140 having a frequency double the frequency of the 2,400 Hz. signal. The trigger signals are then applied to the single shot multivibrator 34 which may comprise a NE555 chip SS manufactured and sold by Signetics Corporation.

The output of the multivibrator 34 is then applied to the detector 36 which comprises filter circuitry for obtaining the average DC valve of the multivibrator output by means of an active low pass filter 143 having an 1,800 Hz. cut-off rolling off rapidly at 18 db. per octave, an active 3,000 Hz. notch filter 144 and an active 4,800 Hz. notch filter 146. The output of the notch filter 146 at line 148 may then be connected to the stylus driver 48 as depicted in FIG. 1 as well as the scanning control circuit 42 through a line 148 as will now be described with reference to FIG. 4.

Figure 4:
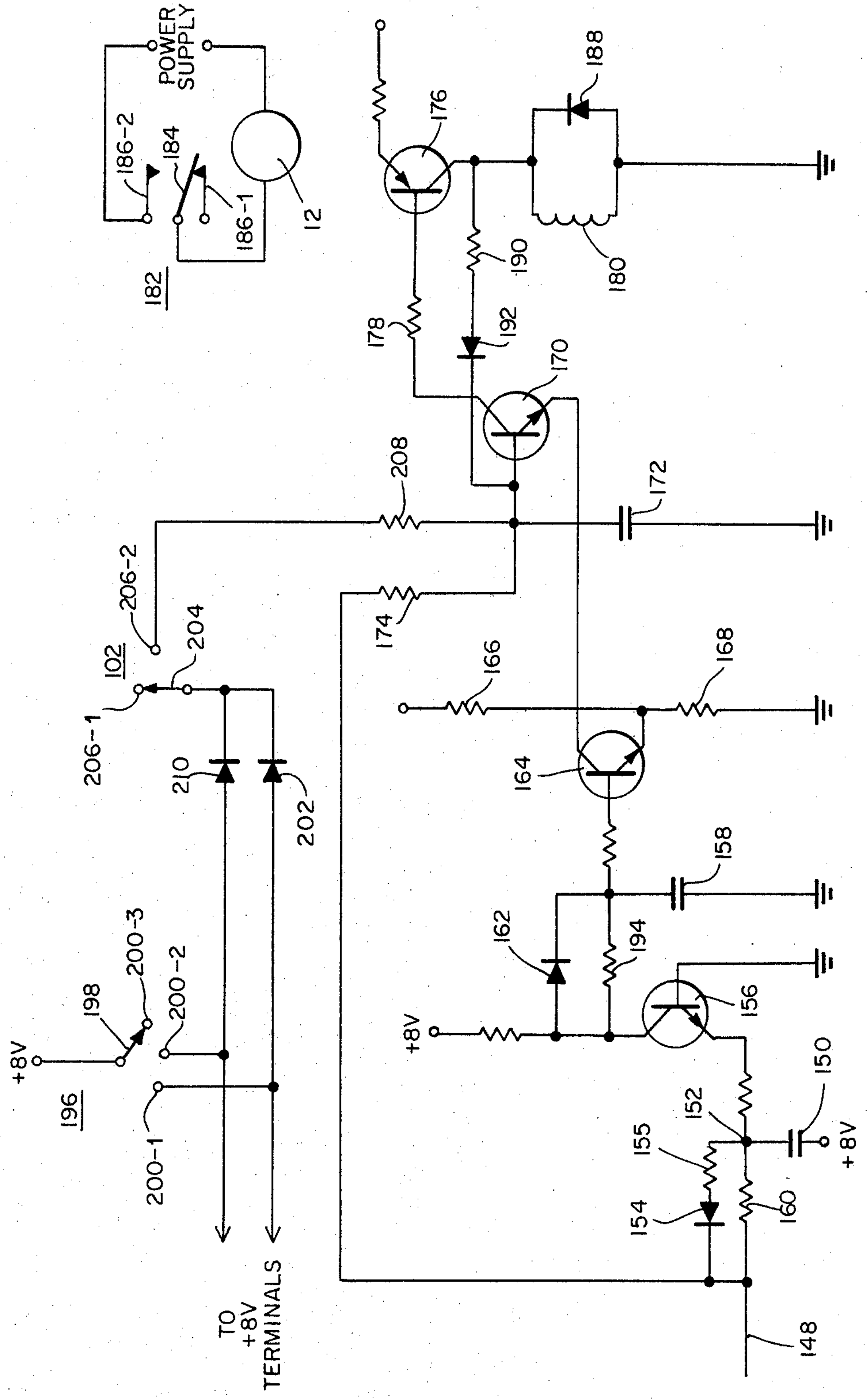
FIG. 4 is a schematic circuit diagram of the scanning control circuit of the facsimile transceiver embodying the invention.

In accordance with one important aspect of the invention, the control circuit 42 as shown in FIG. 4 initiates scanning of the copy medium in response to the initial 2,400 Hz. black signal while substantially immunizing a receiving transceiver from erroneous start-up due to electrical or acoustical noise by being biased into a deenergized state. In this connection, a capacitor 150 is provided which is charged in response to a "whiter than white" frequency modulated signal (less than 1,500 Hz.) to a negative value at the terminal 152 through a diode 154 so as to saturate a transistor 156 before the application of a signal having a frequency of 1,500 Hz. or more. Saturation of the transistor 156 in turn prevents the charging of the storage capacitor 158. However, when a 1,500 to 2,400 Hz. signal is applied to the line 148, the capacitor 150 will rapidly discharge through the resistor 160 thereby rendering the transistor 156 non-conductive allowing the capacitor 158 to charge through a diode 162. After approximately 1 second of charging of the capacitor 158, the transistor 164 having an emitter connected to a voltage divider comprising resistors 166 and 168 becomes conductive.

In accordance with one very important aspect of the invention, the collector of the transistor 164, which becomes conductive after the application of the 1,500 to 2,400 Hz. white to black signal, is connected to an ANDing transistor 170 which has a base connected directly to the line 148. After a period of 15 milliseconds of the 2,400 Hz. black signal of the line 148, a capacitor 172 connected to the base of the transistor 170 will charge through a resistor 174 to a sufficient magnitude at the base of the transistor 170 so as to permit the transistor 170 to conduct as long as the transistor 164 conducts thereby enabling the AND circuit comprising the transistor 170. The collector of the transistor 170 is connected to the base of a transistor 176 through a resistor 178 which conducts when the transistor 170 conducts thereby enabling the AND circuit so as to energize a coil 180 associated with a motor switch 182 to place movable contact 184 in engagement with stationary contact 186-2 to apply power from a suitable power supply to the motor 12. A damping diode 188 is connected in parallel with the coil 180.

In accordance with this invention, noise signals of a frequency substantially less than 1,500 Hz. will apply a negative signal to the junction 152 so as to inhibit the AND circuit by biasing the transistor 156 into a conductive state which can only be overcome by the application of a first enabling signal substantially equal to or in excess of 1,500 Hz. for a predetermined length of time, e.g., 1 second. However, even a signal in excess of 1,500 Hz. for 1 second is not sufficient to enable the AND circuit. Rather, it also requires a second enabling signal approaching 2,400 Hz. for a lesser predetermined length of time, e.g., 15 milliseconds, before the AND circuit will be enabled. In general, it is desirable to choose a length of time such as 15 milliseconds which exceeds the duration of most "clicks" on a telephone line to avoid false start-up.

In order to provide for the continuing operation of the motor 12R after the 2,400 Hz. black signal has terminated, a lock-in feedback circuit is provided from the collection of the transistor 176 to the base of the ANDing transistor 170 including a resistor 190 and a diode 192. This provides for the continuation of the record enabling a signal which allows a 1,500 Hz. white signal to provide for the continuing operation of the motor 12R.

In order to prevent the temporary loss of signal from interrupting the operation of the motor 12R, a discharge resistor 194 is provided in series with the capacitor 158. The resistance of the resistor 194 is properly chosen so as to provide for a relatively slow discharge of the storage capacitor 158, e.g., 4 seconds, in the event that the transistor 156 becomes conductive in the absence of a 1,500 Hz. – 2,400 Hz. signal on the lines 148. Thus the stored charge on the capacitor 158 is able to provide for the continuation of the first enabling signal for a short period of time. If the loss of signal should exceed this predetermined length of time, transistor 164 will become non-conductive along with transistors 170 and 176 so as to interrupt the power to the motor 12R.

Although not shown in FIG. 1, it is also possible to utilize the control circuitry of FIG. 4 to initiate scanning at a transmitting transceiver. Accordingly, a transceiver having both a receiving and a transmitting function may incorporate a function switch 196 shown in FIG. 4 having a movable contact 198 making engagement with a stationary transmit contact 200-1 and a stationary receiving contact 200-2. When the movable contact 198 is placed in engagement with the stationary contact 200-1, a plus 8 volts from a power supply may be applied to the base of the transistor 170 through a diode 202 and a movable contact 204 and associated stationary contact 206-2 of the start switch 192. By appropriately choosing the resistance of a resistor 208 connected between the contact 206 at the base of the transistor 170, the signal applied to the base of the transistor 170 may have the same value as that produced by a black 2,400 Hz. signal applied to the line 148 in the receiver. Since the base of the transistor 170 is connected to the diode 154 through the resistor 174, engagement of the contact 206 by the movable contact 204 for 1 second will render transistors 164, 170 and 176 conductive so as to energize the coil 180 which in turn energizes the motor 12 of the transmitter after closing the switch 182. Note that when the transceiver is utilized as a receiver, the receiver motor may be manually started by placing the contact 198 of the function switch 196 in engagement with the stationary contact 200-2 and actuating the start switch 102 so as to apply the plus 8 volts to the resistor 208 through a diode 210. The plus 8 volts is effective to turn on the transistor 170 assuming that the capacitor 158 has been charged in response to a 1,500 Hz. signal so as to turn the transistor 164 on.

When the coil 180 of the transmitting transceiver has been energized, the movable contact 110 which is coupled to the coil 180 is moved so as to engage the stationary contact 112-2. This appropriately biases the photodetector transistor 14 for detection of light-dark variations in a document at the transceiver.

As mentioned previously, ambient noise having a frequency substantially less than 1,500 Hz. generates a signal at the junction 152 having a negative polarity so as to bias the transistor 156 of the control circuit shown in FIG. 4 to a conductive state. Reference will now be made to the receiving circuit of FIG. 3 wherein the generation of the signals on the line 148 will be described.

After the received FM signals pass through the input filter 128 and the preamplifier 30, the zero crossings of the input signal to the coupler 28 (which is essentially sinusoidal) are detected by the differentiating circuit 32 which generates a series of trigger pulses 220 which are shown as waveform A in FIG. 3*a*. Since the trigger pulses 220 of the waveform A represent the zero crossings of the coupler input signal, the frequency of the trigger pulses varies with and is directly proportional to the frequency of the coupler input signal. More particularly, the frequency of the trigger pulses 220 in waveform A are equal to twice the frequency of the coupler input signal. The trigger pulses 220 of waveform A are then utilized to trigger the single shot multivibrator 34 to generate waveform B of FIG. 3a where the duration of the astable state depicted by pulses 222 is constant while the duty cycle of the multivibrator 34 varies with the frequency of the trigger pulses 220 depicted by the waveform A. In other words, the trigger pulses 220 in the waveform A correspond with the onset of the pulses 222 in the waveform B. As shown in waveforms A and B, the closely spaced pulses 220 and 222 between times $t_1$ and $t_2$ and times $t_3$ and $t_4$ correspond with the transmission of a 2,400 Hz. black signal while the more widely spaced pulses 220 and 222 between times $t_2$ and $t_3$ correspond with the lower frequency 1,500 Hz. white signal.

Waveform C of FIG. 3*a* depicts the average DC value of the waveform B while waveform D shows a shifted average DC value of waveform C such that a 1,500 Hz. white FM signal corresponds to zero volts ($t_2 < t < t_3$), a 2,400 Hz. FM "black" signal corresponds to a DC voltage of positive polarity ($t_1 < t < t_2$ and $t_3 < t < t_4$) and low frequency noise signals less than 1,500 Hz. in frequency correspond to a DC voltage of less than zero volts ($t < t_1$ and $t > t_4$). The detection of the average DC value for the waveform and the DC shifting so as to establish a zero volt DC signal corresponding to a 1,500 Hz. FM white signal is accomplished by the detector 36 comprising the active filters 142, 144 and 146 and values above and below zero as a function of the deviation from 1,500 Hz. This produces a writing control signal which is directly proportional to the ratio of the astable state duration or duty cycle of the single shot multivibrator to the period of a multivibrator cycle. Note that the ratio increases with black FM signals and decreases with white FM signals to zero.

Figure 2:
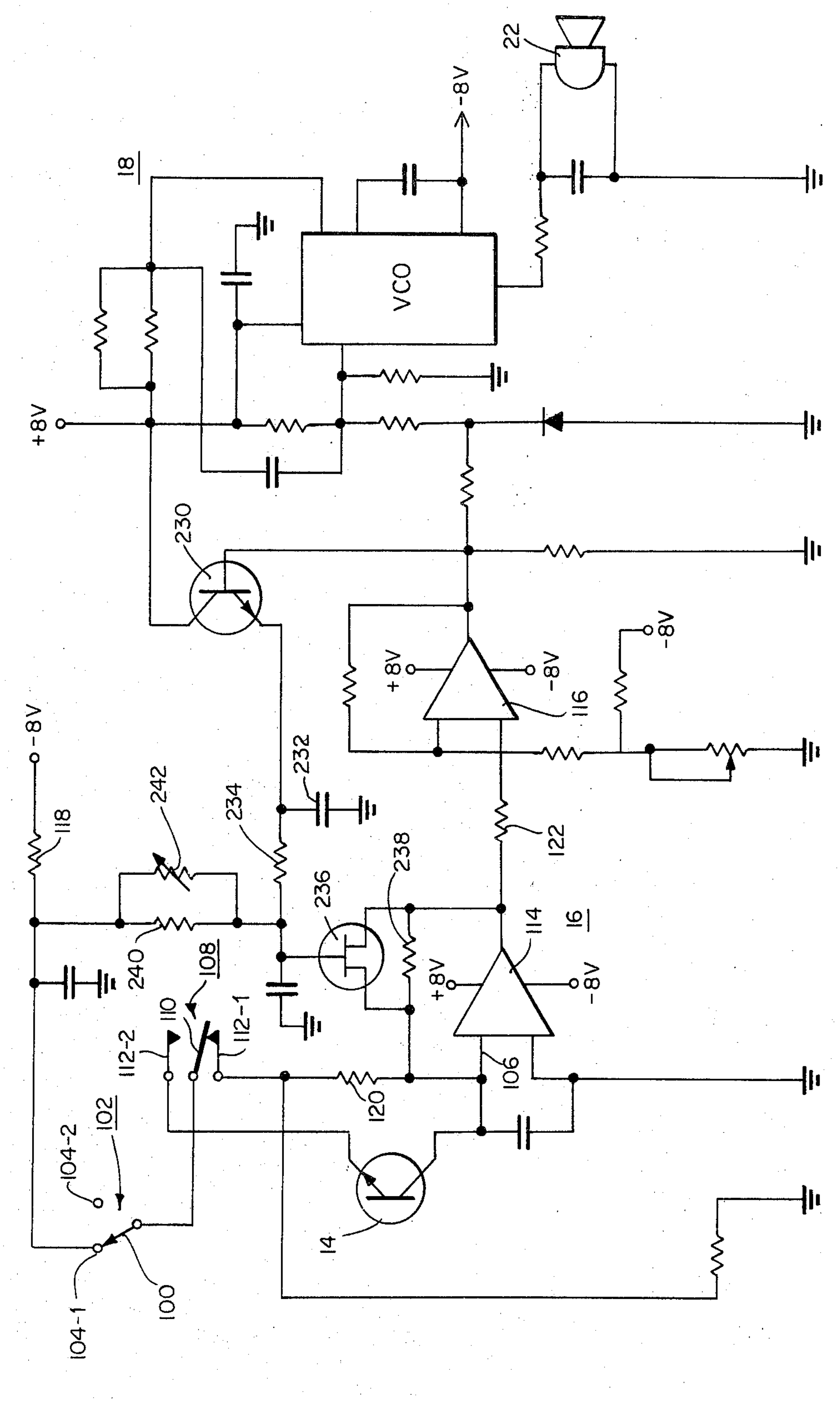
FIG. 2 is a schematic circuit diagram of the transmitting portion of a transceiver embodying the invention.

Referring again to the transmitting circuit of FIG. 2, the transistor 14 is turned on in response to the sensing of white on the document and is turned off in response to the sensing of black on the document as the document is scanned. It will be seen that the transmitting circuit includes automatic gain control in the preamplifier 16 comprising a feedback transistor 230 having a base connected to the output of the operational amplifier 116 to render the transistor 230 conductive in response to the detection of a white signal by the phototransistor 14. When the transistor 230 is conductive, a capacitor 232 is charged to a positive voltage by the plus 8 volts supply, which positive voltage is applied through a resistor 234 to the gate electrode of a field effect transistor 236 causing it to conduct thereby lowering the feedback impedance otherwise provided by the feedback resistor 238 so as to lower the gain of the operational amplifier 114. In the absence of a white signal, a resistor 240 in parallel with calibrating resistor 242, applies a negative bias to the gate of the field effect transistor 236 so as to maintain the transistor in the non-conductive state.

In the discussion of the preferred embodiment of this invention, it has been suggested that the AND circuit of the scanning control circuit 42 is enabled by one AND input corresponding to an FM signal approaching 1500 Hz. or more and having a duration of 1 second and a second AND input corresponding to an AM signal approaching 2,400 Hz. and having a duration of 15 milliseconds. Actually, the signals need not correspond to these frequencies. In general, it is desirable that the first AND input correspond to an FM signal having a frequency in excess of 1,400 Hz. and the second AND input correspond to an FM signal in excess of 2,200 Hz. where the enabling duration or length in time of the 2,200 Hz. signal is substantially less than the duration or length of time of the enabling 1,400 Hz. signal. In choosing the critical FM frequencies, it is important to choose a frequency for the first AND input which will enable ambient noise to bias the first AND input circuit to the inhibiting state. At the same time, it is desirable to choose a second AND input frequency which is sufficiently high so as not to enable the AND circuit with sustained ambient noise. Also, the 1 second enabling duration for the 1,400 Hz. signal may be less, e.g., one-half second or more and the 15 millisecond enabling duration for the 2,200 Hz. signal may be less, e.g., 10–20 milliseconds with 12–15 milliseconds preferred.

In FIG. 2, the voltage controlled oscillator 124 has been shown as a VCO chip with appropriate connections for a Signetics Corporation NE565 chip. It will of course be appreciated that other voltage controlled oscillators might be utilized. Similarly, the dectector 34 in FIG. 3 has been shown as an SS chip with suitable connections for a Signetics Corporation NE555 chip. Again it will be appreciated that other single shot multivibrators might be utilized.

Although a particular embodiment of the invention has been shown and described and various modifications have been suggested, it will be understood that the true spirit and scope of the invention as set forth in the appended claims embrace other modifications and embodiments which will occur to those of ordinary skill in the art.

What is claimed is:

1. A facsimile system producing a copy at one location which is a facsimile of a document located at another location comprising:

a transmitter including:

means for detecting the light-dark variations in a document, and means for generating FM signals having frequencies ranging from 1,500 Hz. to 2,400 Hz. in response to the detected light-dark variations where 1,500 Hz. substantially represents white on the document and 2,400 Hz. substantially represents black on the document;

a communications network coupled to the transmitter for transmitting FM signals; and a receiver coupled to the communications network and including:

trigger means for generating relatively high frequency trigger signals in response to and having a frequency proportional to the frequency of said 1,500 to 2,400 Hz. FM signals and relatively low frequency noise signals;

a single shot multivibrator coupled to the output of said means for generating trigger signals and characterized by an astable state of fixed duration initiated in response to said trigger signals and said relatively low frequency noise signals wherein the ratio of the astable state duration to the period of a multivibrator cycle is directly proportional to the frequency of the FM signals;

detector means coupled to the output of said single shot multivibrator for generating a control signal representing the ratio of the astable state to the period of said multivibrator cycle;

writing means coupled to the output of said detector means and responsive to said control signal for marking on a copy medium to reproduce said light-dark variations of said document on said copy medium;

scanning means for moving said writing means relative to said copy medium; and control means having an input connected to the output of said detector means and an output connected to the input of said scanning means for biasing said scanning means into a deenergized state when the ratio of said astable state to the period of the multivibrator cycle is less than a predetermined value and overcoming said bias to initiate scanning by said scanning means when the ratio of said astable state to the period of the multivibrator cycle is greater than said predetermined value for a predetermined length of time.

2. The facsimile system of claim 1 further comprising:

a telephone handset coupled to said telephone lines; and an acoustical-to-electrical transducer coupled between said telephone handset and said trigger means of said receiver, said acoustical-to-electrical transducer picking up said low frequency noise signals.

3. The facsimile system of claim 1 wherein said control means comprises:

AND circuit means having a pair of inputs and an output connected to said scanning means;

first AND input means connected to one of said pair of inputs for applying a first enabling signal to said AND circuit when said ratio is more than said predetermined value for said predetermined time; and second AND input means connected to the other of said pair of inputs for applying a second enabling signal to said AND circuit means when said ratio is more than a higher predetermined value for a lesser predetermined time.

4. The facsimile system of claim 3 wherein said predetermined value corresponds to FM signals having a frequency in excess of 1,400 Hz. and said higher predetermined value corresponds to FM signals having a frequency in excess of 2,200 Hz.

5. The facsimile system of claim 3 wherein said AND circuit means includes feedback means for continuing generation of said second enabling signal after initial enabling of said AND circuit means even when said ratio is less than said higher predetermined value.

6. The facsimile system of claim 5 wherein said first AND input means includes storage means for continuing generation of said first enabling signal for a limited period of time even when said ratio is less than said predetermined value.

7. The facsimile system of claim 4 wherein said predetermined time is in excess of one-half second and said lesser predetermined time is in excess of 5 milliseconds.

8. The facsimile system of claim 7 wherein said detector means generates said control signal having a magnitude substantially proportional to the average DC value of the output of said single shot multivibrator.

9. A facsimile receiver for producing a copy at a receiving location in response to FM signals transmitted over conventional voice communication lines where said FM signals range from 1,500 to 2,400 Hz. and represent light-dark variations in a document at a remote transmitting location with 1,500 Hz. substantially representing white on the document and 2,400 Hz. substantially representing black on the document, said receiver comprising:

trigger means responsive to said FM signals and low frequency noise below 1,500 Hz. to generate trigger signals having a variable frequency proportional to the frequency of said FM signals and said noise;

a single shot multivibrator coupled to the output of said trigger means generating a multivibrator output signal having an astable state of fixed duration initiated in response to said trigger signals, the ratio of the astable state duration to the period of a multivibrator cycle being directly proportional to the frequency of said trigger signals;

detector means coupled to the output of said single shot multivibrator and responsive to the ratio of said astable state of fixed duration and the period of said multivibrator cycle for generating a writing control signal varying as a function of the deviation of said trigger signal frequency above and below the frequency corresponding to FM signals of 1,500 Hz.; and writing means coupled to the output of said single shot multivibrator for marking on a copy medium to reproduce said light-dark variations of said document on said copy medium in response to said writing control signal.

10. The facsimile receiver of claim 9 wherein said writing control signal is a DC signal proportional to said deviation of said trigger signal frequency and having polarity dependent upon the direction of deviation.

11. The facsimile receiver of claim 9 wherein said detector means DC averages the output of said single shot multivibrator to generate said control signal.

12. A facsimile receiver for producing a copy on a copy medium at a receiving location in response to FM signals transmitted over conventional voice communication telephone lines where said FM signals represent light-dark variations in a document at a remote transmitting location with a first frequency representing white on the document and a second frequency representing black on the document, said receiver comprising:

means for generating trigger signals in response to and having a frequency proportional to the frequency of said FM signals;

a single shot multivibrator coupled to the output of said means for generating trigger signals and characterized by an astable state of fixed duration initiated in response to one of said trigger signals, the ratio of the astable state duration to the period of the multivibrator cycle being directly proportional to the frequency of said FM signals;

detector means coupled to the output of said single shot multivibrator for detecting the ratio of said astable state duration to the period of the multivibrator cycle and generating a control signal representing said ratio; and means for marking said copy medium in response to said control signal to produce a copy of the document.

13. The facsimile receiver of claim 12 wherein said detector means DC averages the output of said single shot multivibrator to generate said control signal.

14. A facsimile receiver for producing a copy of a document at a receiving location in response to a bandwidth of FM signals representing dark-light variations in a document at a transmitting location, said receiver comprising:

demodulator means for generating a writing control signal representing light-dark variations in said document in response to said FM signals;

writing means coupled to the output of said detector means and responsive to said control signal for marking on a copy medium to produce said light-dark variations thereon;

scanning means for moving said writing means relative to said copy medium; and control means having an input connected to the output of said demodulator means and an output connected to the input of said scanning means for biasing said scanning means into a deenergized state in response to noise signals lying outside said bandwidth of FM signals and overcoming said bias in response to FM signals lying within said bandwidth to initiate scanning by said scanning means after a predetermined length of time.

* * * * *